United States Patent
Kondo (10) Patent No.: US 11,142,068 B2
(45) Date of Patent: Oct. 12, 2021

(54) CONTROL DEVICE FOR DRIVE FORCE TRANSMISSION DEVICE

(71) Applicant: JTEKT CORPORATION, Osaka (JP)

(72) Inventor: Hirokazu Kondo, Takahama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/857,366

(22) Filed: Apr. 24, 2020

(65) Prior Publication Data
US 2020/0369147 A1 Nov. 26, 2020

(30) Foreign Application Priority Data
May 20, 2019 (JP) .............................. JP2019-094550

(51) Int. Cl.
*B60K 23/08* (2006.01)
*F16D 48/06* (2006.01)

(52) U.S. Cl.
CPC .............. *B60K 23/08* (2013.01); *F16D 48/06* (2013.01); *F16D 2500/50293* (2013.01)

(58) Field of Classification Search
CPC ............ B60K 23/08; B60K 2023/0858; B60K 2023/0833; B60K 23/0808; B60K 17/34; B60K 17/348; F16D 48/06; F16D 2500/50293
See application file for complete search history.

(56) References Cited

U.S. PATENT DOCUMENTS

| 2005/0121247 | A1 | 6/2005 | Murakami et al. |
| 2016/0280064 | A1* | 9/2016 | Nozu ..................... F16D 48/06 |
| 2017/0182885 | A1* | 6/2017 | Suzuki ................... B60K 23/08 |
| 2018/0354361 | A1* | 12/2018 | Pillen .................... B60K 17/35 |

FOREIGN PATENT DOCUMENTS

| JP | 2005-162007 A | 6/2005 |
| JP | 2016-159745 A | 9/2016 |

\* cited by examiner

*Primary Examiner* — Justin Holmes
(74) *Attorney, Agent, or Firm* — Oblon, McClelland, Maier & Neustadt, L.L.P.

(57) ABSTRACT

A control device is mountable on a four-wheel drive vehicle including a main drive wheel and an auxiliary drive wheel, and is configured to control a drive force transmission device configured to transmit a drive force to the auxiliary drive wheel. The control device includes a processor and a memory storing a program, when executed by the processor, to cause the control device to change a control characteristic of the drive force transmission device that indicates a relationship between a vehicle state of the four-wheel drive vehicle and a drive force transmitted to the auxiliary drive wheel in response to an input from the input device.

7 Claims, 5 Drawing Sheets

CONTROL DEVICE FOR DRIVE FORCE TRANSMISSION DEVICE

CROSS-REFERENCES TO RELATED APPLICATIONS

This application is based upon and claims the benefit of priority from Japanese Patent Application No. 2019-094550, filed on May 20, 2019, the entire contents of which are incorporated herein by reference.

FIELD

One or more embodiments of the present invention relate to a control device that is mounted on a four-wheel drive vehicle including a main drive wheel and an auxiliary drive wheel, and that is configured to control a drive force transmission device configured to transmit a drive force to the auxiliary drive wheel.

BACKGROUND

A four-wheel drive vehicle including a main drive wheel and an auxiliary drive wheel, and a drive force transmission device is mounted on the four-wheel drive vehicle and configured to transmit a drive force to the auxiliary drive wheel. The drive force transmission device is controlled by a control device that stores a control characteristic indicating a relationship between a vehicle state and a drive force to be transmitted to the auxiliary drive wheel.

JP-A-2005-162007 descries a control device to converge a vibration phenomenon. The vibration phenomenon is a phenomenon in which a main drive wheel and an auxiliary drive wheel alternately slip due to torsion of a propeller shaft at a time of a vehicle starting in a four-wheel drive state in which a drive force is transmitted to the main drive wheel and the auxiliary drive wheel. Particularly, the control device reduces the driving force to be transmitted to the auxiliary drive wheel when the vibration phenomenon occurs, thereby converging the vibration phenomenon.

JP-A-2016-159745 describes a control device including an abnormal noise prevention unit. The abnormal noise prevention unit increases drive force distribution to the auxiliary drive wheel so as to prevent generation of abnormal noise when an operation region indicated by an engine speed or the like is in an abnormal noise generation region where abnormal noise is generated in a drive force transmission system configured to transmit a drive force of an engine to the auxiliary drive wheel.

SUMMARY

For example, when the vehicle starts on a low friction road, in terms of stable start, it is desirable to control the vehicle in the four-wheel drive state in which the drive force transmitted to the auxiliary drive wheel is substantially the same as that of the main drive wheel. When the vehicle travels on the low friction road, in terms of prevention of slip, it is desirable to transmit a drive force to the auxiliary drive wheel in response to a vehicle speed or the like regardless of whether the operation region of the engine is in the abnormal noise generation region. However, as described in JP-A-2005-162007 and JP-A-2016-159745, prevention of vibration or abnormal noise and performance which is traveling stability or the like may be in a contradictory relationship.

Preferences of drivers vary. For example, some drivers prefer low vibration or silence to an extent that vibration or noise is hardly perceived, and some drivers demand that high traveling stability performance as a four-wheel drive vehicle or the like be sufficiently exhibited rather than low vibration and noise. However, the related-art control device of the drive force transmission device is tuned to moderate control characteristics that would not cause dissatisfaction of a larger number of drivers. Therefore, some drivers cannot necessarily obtain a high degree of satisfaction.

One or more embodiments of the present invention have been made in view of the above-described circumstances. An object of one or more embodiments of the present invention is to provide a control device for a drive force transmission device capable of improving a degree of satisfaction of a larger number of drivers.

In an aspect of the present invention, there is provided a control device that is mountable on a four-wheel drive vehicle including a main drive wheel and an auxiliary drive wheel, and that is configured to control a drive force transmission device configured to transmit a drive force to the auxiliary drive wheel, the control device including: a processor and a memory storing a program, when executed by the processor, to cause the control device to change a control characteristic of the drive force transmission device that indicates a relationship between a vehicle state of the four-wheel drive vehicle and a drive force transmitted to the auxiliary drive wheel in response to an input from the input device.

According to the control device for a drive force transmission device of one or more embodiments of the present invention, it is possible to improve a degree of satisfaction of a larger number of drivers.

DETAILED DESCRIPTION

First Embodiment

The first embodiment of the present invention will be described with reference to FIGS. 1 to 6. The embodiment described below is given as an appropriate example for carrying out the present invention, and various technically preferable technical matters are specifically exemplified. However, the technical scope of the present invention is not limited to this specific embodiment.

Figure 1:
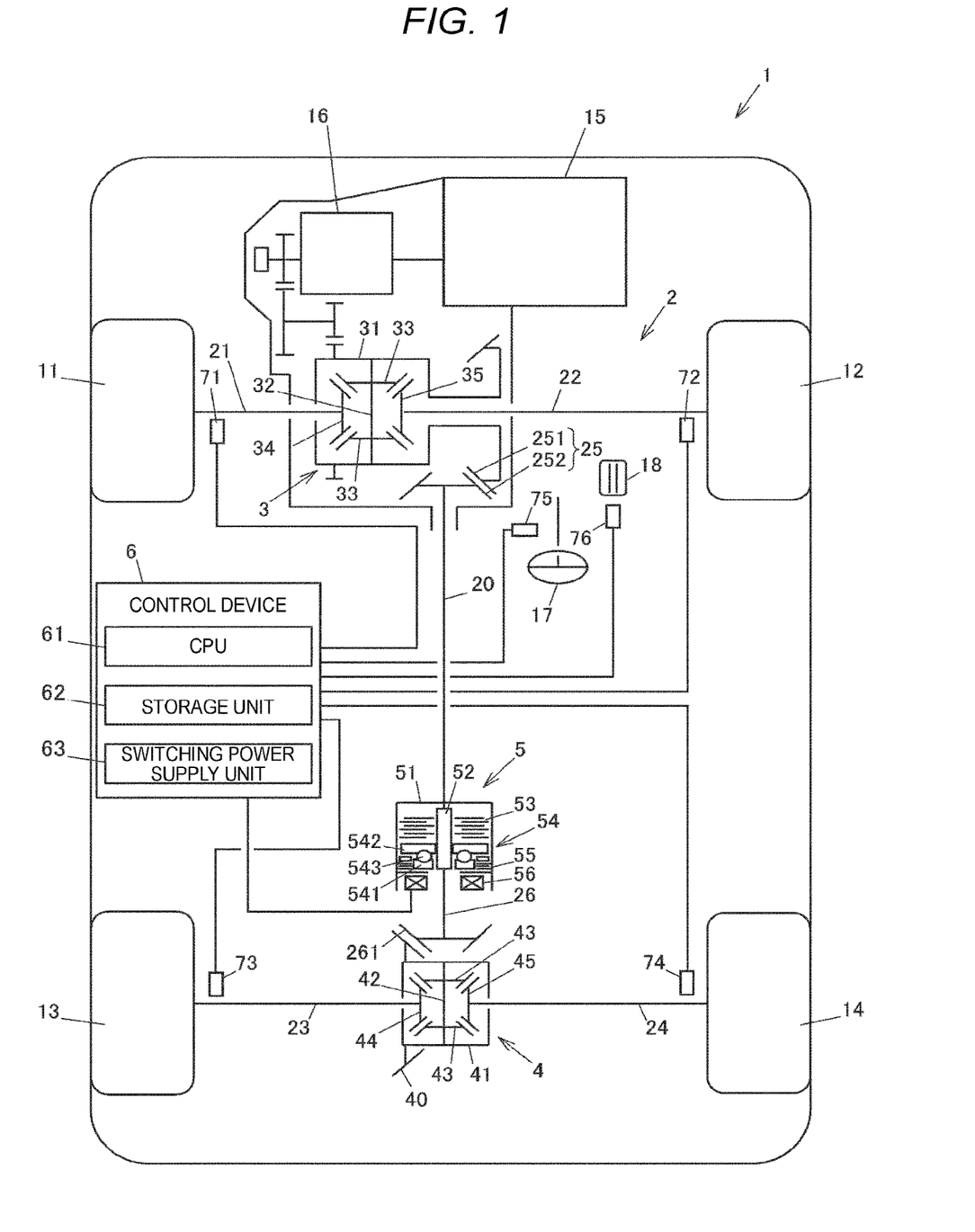
FIG. 1 is a schematic view illustrating a configuration example of a four-wheel drive vehicle according to a first embodiment of the present invention.

FIG. 1 is a schematic view illustrating a configuration example of a four-wheel drive vehicle 1 according to the first embodiment of the present invention. The four-wheel drive vehicle 1 includes a left front wheel 11 and a right front wheel 12 as left and right main drive wheels, a left rear wheel 13 and a right rear wheel 14 as left and right auxiliary drive wheels, an engine 15 as a drive source, a transmission 16 configured to shift rotation of an output shaft of the engine 15, and a drive force transmission system 2 configured to transmit a drive force of the engine 15 shifted by the transmission 16 to the left and right front wheels 11, 12 and the left and right rear wheels 13, 14. An electric motor may be used as the drive source, and a drive source may be a so-called hybrid system in which an engine and an electric motor are combined.

The drive force transmission system 2 includes left and right drive shafts 21, 22 on a front wheel side, left and right drive shafts 23, 24 on a rear wheel side, a front differential 3 which is a differential device on the front wheel side, a rear differential 4 which is a differential device on the rear wheel side, a propeller shaft 20 configured to transmit a drive force in a vehicle front-rear direction, a drive force transmission device 5 configured to transmit a drive force to the left rear wheel 13 and the right rear wheel 14, and a control device 6 configured to control the drive force transmission device 5. In the present embodiment, the drive force transmission device 5 is provided between the propeller shaft 20 and the rear differential 4 so as to adjust a drive force transmitted from the propeller shaft 20 to the left rear wheel 13 and the right rear wheel 14.

The front differential 3 includes a front differential case 31, a pinion shaft 32 that rotates integrally with the front differential case 31, a pair of pinion gears 33, 33 pivotally supported by the pinion shaft 32, and first and second side gears 34, 35 that mesh with the pair of pinion gears 33, 33 such that gear shafts thereof are orthogonal to each other, and is configured to distribute a drive force to the left front wheel 11 and the right front wheel 12. The left and right drive shafts 21, 22 on the front wheel side are respectively connected to the first and second side gears 34, 35 so as not to be relatively rotatable.

A drive force output from the transmission 16 is transmitted to the front differential case 31 of the front differential 3, and is transmitted from the front differential case 31 to the propeller shaft 20 via a gear mechanism 25. The gear mechanism 25 is, for example, a pair of hypoid gears, and is formed by meshing a ring gear 251 that rotates integrally with the front differential case 31 and a pinion gear 252 provided at one end of the propeller shaft 20. The other end of the propeller shaft 20 is connected to the drive force transmission device 5 via, for example, a cross joint (not illustrated).

The drive force transmission device 5 includes a bottomed cylindrical housing 51 to which a drive force from the propeller shaft 20 is input, an inner shaft 52 coaxially and rotatably supported on the housing 51, a multi-plate clutch 53 including a plurality of clutch plates provided between the housing 51 and the inner shaft 52, a cam mechanism 54 configured to generate a pressing force for pressing the multi-plate clutch 53, an electromagnetic clutch 55 configured to transmit an operating force for operating the cam mechanism 54, and an electromagnetic coil 56 to which an exciting current is supplied from the control device 6.

When the electromagnetic coil 56 is energized, the electromagnetic clutch 55 is engaged by a generated magnetic force, and a part of a rotation force of the housing 51 is transmitted to a pilot cam 541 of the cam mechanism 54 by the electromagnetic clutch 55. The cam mechanism 54 includes the pilot cam 541 and a main cam 542 that can be relatively rotated within a predetermined angle range, and a plurality of cam balls 543 that can roll between the pilot cam 541 and the main cam 542. In the pilot cam 541 and the main cam 542, cam grooves on which cam balls 543 roll are formed being inclined with respect to respective circumferential directions.

The main cam 542 is axially movable relative to the inner shaft 52 and is not rotatable relative to the inner shaft 52. When the pilot cam 541 rotates relative to the main cam 542 by a rotation force transmitted by the electromagnetic clutch 55, the cam ball 543 rolls in the cam groove, and the main cam 542 is separated from the pilot cam 541. Accordingly, the multi-plate clutch 53 is pressed to bring the clutch plates into frictional contact with one another, and a drive force is transmitted between the housing 51 and the inner shaft 52. A drive force transmitted by the multi-plate clutch 53 changes according to magnitude of a current supplied to the electromagnetic coil 56.

A pinion gear shaft 26 including a gear portion 261 at one end thereof is connected to the inner shaft 52 of the drive force transmission device 5 not being relatively rotatable. The gear portion 261 of the pinion gear shaft 26 meshes with a ring gear 40 fixed to the rear differential case 41 of the rear differential 4.

The rear differential 4 includes a rear differential case 41, a pinion shaft 42 that rotates integrally with the rear differential case 41, a pair of pinion gears 43, 43 pivotally supported by the pinion shaft 42, and first and second side gears 44, 45 that mesh with the pair of pinion gears 43, 43 such that gear shafts thereof are orthogonal to each other, and is configured to distribute a drive force to the left rear wheel 13 and the right rear wheel 14. The left and right drive shafts 23, 24 on the rear wheel side are respectively connected to the first and second side gears 44, 45 so as not to be relatively rotatable.

The control device 6 includes a CPU 61 as an example of a processor, a storage unit 62 including a semiconductor storage element which is a ROM, a RAM, or the like, and a switching power supply unit 63 configured to generate a current to be supplied to the electromagnetic coil 56 of the drive force transmission device 5. The storage unit 62 is configured to store a program that indicates a procedure of calculation processing to be executed by the CPU 61 and a control characteristic of the drive force transmission device 5 that indicates a relationship between a vehicle state of the four-wheel drive vehicle 1 and a drive force transmitted to the left and right rear wheels 13, 14. The CPU 61 can adjust a current supplied from the switching power supply unit 63 to the electromagnetic coil 56 by increasing or decreasing a duty ratio of a PWM signal supplied to the switching power supply unit 63.

The CPU 61 of the control device 6 can acquire detection values of rotation speed sensors 71 to 74 configured to detect respective rotation speeds of the left front wheel 11, the right front wheel 12, the left rear wheel 13, and the right rear wheel 14, a detection value of a steering angle sensor 75 configured to detect a steering angle of a steering wheel 17 steered by a driver, and a detection value of an accelerator pedal sensor 76 configured to detect a press-down amount of an accelerator pedal 18. These detection values are examples of the vehicle state of the four-wheel drive vehicle 1.

When the four-wheel drive vehicle 1 travels straight, the CPU 61 mainly controls the drive force transmission device 5 based on a press-down amount of the accelerator pedal 18 detected by the accelerator pedal sensor 76 and a rotation speed difference (a difference between an average rotation speed of the left and right front wheels 11, 12 and an average rotation speed of the left and right rear wheels 13, 14) between the front and rear wheels obtained from the rotation speeds of the left and right front wheels 11, 12 and the left and right rear wheels 13, 14 that are detected by the rotation speed sensors 71 to 74.

More specifically, the CPU 61 calculates a drive force sensitive torque based on a press-down amount of the accelerator pedal 18, calculates a differential rotation sensitive torque based on a rotation speed difference between the front and rear wheels, and calculates a command torque which is a command value of a drive force to be transmitted to the left and right rear wheels 13, 14 by adding the drive force sensitive torque and the differential rotation sensitive torque. The CPU 61 sets a duty ratio of the PWM signal to be supplied to the switching power supply unit 63 according to the command torque.

When the four-wheel drive vehicle 1 starts, the CPU 61 calculates a start time torque based on an estimated value of a road surface friction coefficient, and sets the start time torque as a command torque. The estimated value of a road surface friction coefficient can be obtained based on, for example, a temperature or a usage status of a wiper. For example, when an air temperature is 0° C. or lower or when the wiper is used, the road surface friction coefficient is estimated to be low, and the estimated value of the road surface friction coefficient is set to be lower as the air temperature is lower and an operation speed of the wiper is higher. The estimated value of the road surface friction coefficient may be obtained based on the rotation speed difference between the front and rear wheels when the vehicle travels before stopping. When the road surface friction coefficient is low, slip of the left and right front wheels 11, 12 and the left and right rear wheels 13, 14 is likely to occur, so that the estimated value of the road surface friction coefficient is set according to occurrence frequency of the slip.

Figure 2:
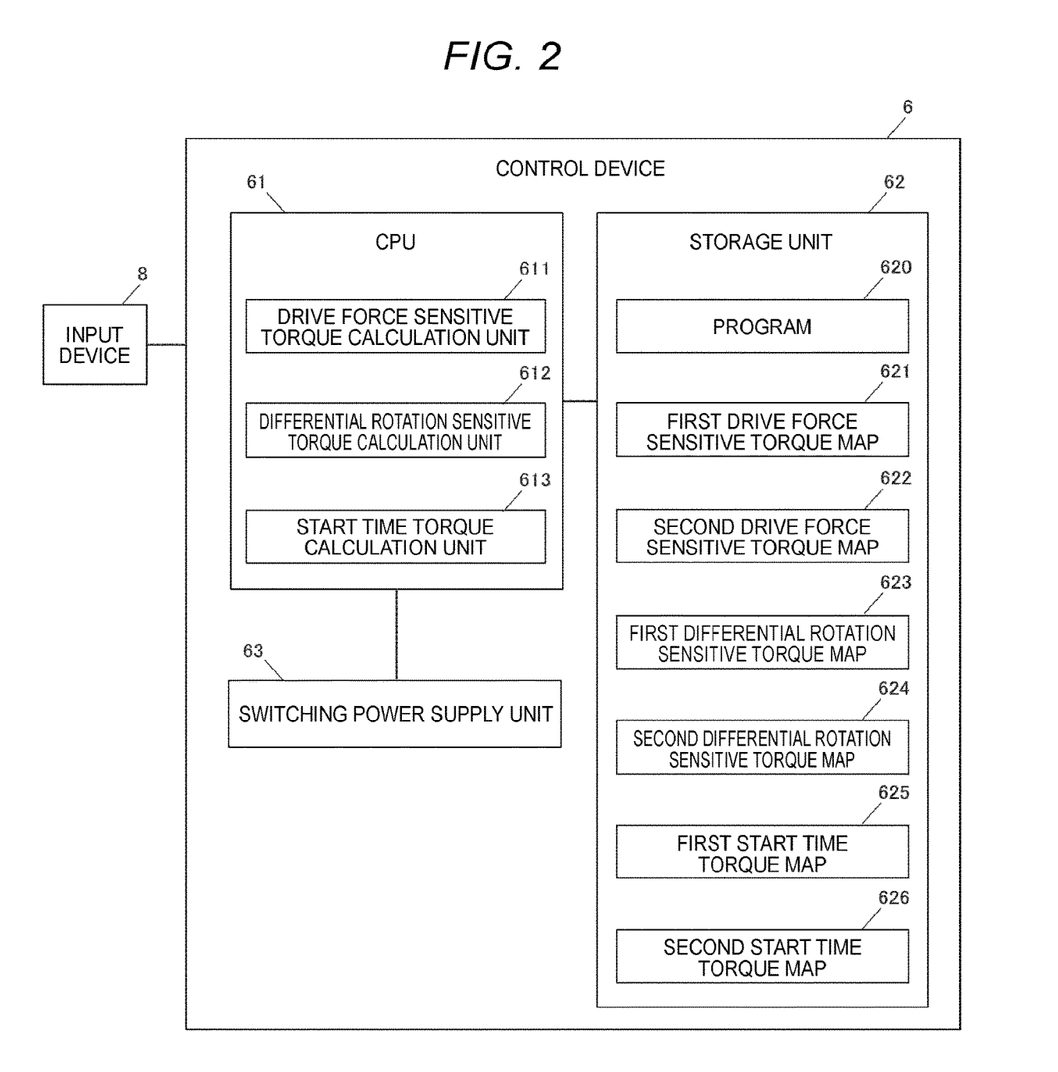
FIG. 2 is a functional block diagram showing a configuration example of a part of functions of a control device.

FIG. 2 is a functional block diagram showing a configuration example of a part of functions of the control device 6. The storage unit 62 is configured to store a program 620, first and second drive force sensitive torque maps 621, 622, first and second differential rotation sensitive torque maps 623, 624, and first and second start time torque maps 625, 626. The CPU 61 functions as a drive force sensitive torque calculation unit 611, a differential rotation sensitive torque calculation unit 612, and a start time torque calculation unit 613 by executing the program 620.

The CPU 61 can communicate with an input device 8 configured to receive operation of the driver. The input device 8 is, for example, a car navigation device, and can receive predetermined input operation by the driver touching a graphic user interface (GUI) screen displayed on a touch panel. The CPU 61 can acquire result information of the input operation from the input device 8 by, for example, controller area network (CAN) communication.

The input device 8 is not limited to a car navigation device, and may be a portable information terminal which is a smartphone of the driver or the like. In this case, the CPU 61 wirelessly acquires the result information of the input operation performed by the driver. The input device 8 may be a push button switch or a rotary switch.

The first and second drive force sensitive torque maps 621, 622, the first and second differential rotation sensitive torque maps 623, 624, and the first and second start time torque maps 625, 626 that are stored in the storage unit 62 correspond to the control characteristic of the drive force transmission device 5 that indicates the relationship between the vehicle state of the four-wheel drive vehicle 1 and the drive force transmitted to the left and right rear wheels 13, 14.

The first drive force sensitive torque map 621, the first differential rotation sensitive torque map 623, and the first start time torque map 625 are a specific example of a first control characteristic according to the present invention in which vibration prevention performance for preventing vibration and noise generated in the four-wheel drive vehicle 1 is prioritized. The second drive force sensitive torque map 622, the second differential rotation sensitive torque map 624, and the second start time torque map 626 are a specific example of a second control characteristic according to the present invention in which performance contradictory with the vibration prevention performance is prioritized.

Figure 3A:
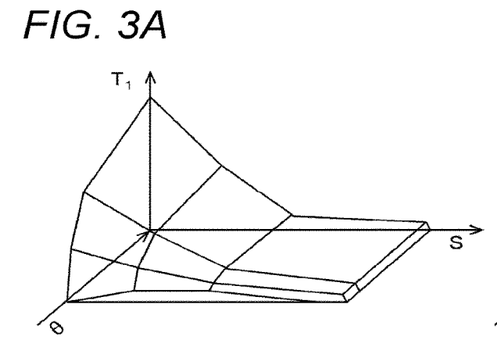
FIG. 3A shows a first drive force sensitive torque map.
Figure 3B:
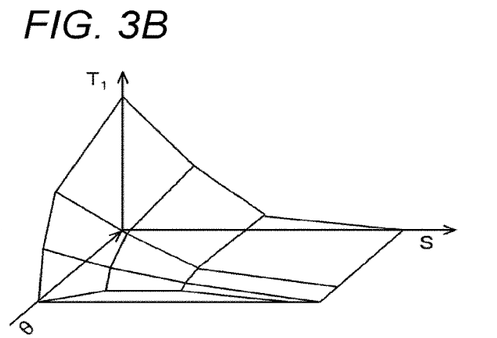
FIG. 3B shows a second drive force sensitive torque map.

FIG. 3A shows the first drive force sensitive torque map 621, and FIG. 3B shows the second drive force sensitive torque map 622. In FIGS. 3A and 3B, an X axis indicates a vehicle speed S, a Y axis indicates a press-down amount θ of an accelerator pedal, and a Z axis indicates a drive force sensitive torque $T_1$. The first and second drive force sensitive torque maps 621, 622 show a control characteristic that the drive force sensitive torque T1 increases as the vehicle speed S decreases and the press-down amount θ of the accelerator pedal increases. The CPU 61 functions as the drive force sensitive torque calculation unit 611 to calculate the drive force sensitive torque $T_1$ by referring to a drive force sensitive torque map selected by the driver from the first and second drive force sensitive torque maps 621, 622.

The first drive force sensitive torque map 621 has the larger drive force sensitive torque T1 especially in a high vehicle speed range than that of the second drive force sensitive torque map 622, and the drive force sensitive torque $T_1$ that is a constant value or larger is set even in the high vehicle speed range. Therefore, when the first drive force sensitive torque map 621 is selected, a drive force transmitted to the left and right rear wheels 13, 14 when the four-wheel drive vehicle 1 travels in a steady traveling state is larger than that when the second drive force sensitive torque map 622 is selected. Here, the steady traveling state refers to a state of traveling at a constant vehicle speed or higher without acceleration or deceleration.

Accordingly, when the first drive force sensitive torque map 621 is selected, for example, generation of noise due to rattle of the ring gear 251 and the pinion gear 252 in the gear mechanism 25 is prevented. On the other hand, in the first drive force sensitive torque map 621, the drive force sensing torque $T_1$ is the constant value or larger even in the high vehicle speed range, so that friction loss in the drive force transmission system 2 configured to transmit the drive force to the left and right rear wheels 13 increases, and fuel efficiency decreases.

Figure 4A:
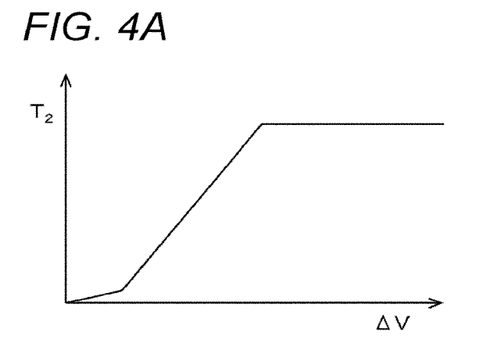
FIG. 4A shows a first differential rotation sensitive torque map.
Figure 4B:
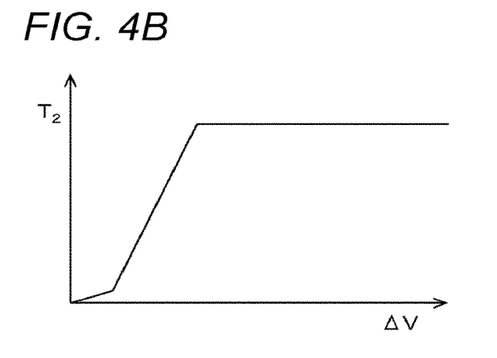
FIG. 4B shows a second differential rotation sensitive torque map.

FIG. 4A shows the first differential rotation sensitive torque map 623, and FIG. 4B shows the second differential rotation sensitive torque map 624. In FIGS. 4A and 4B, an X axis indicates a rotation speed difference ΔV between the front and rear wheels, and a Y axis indicates a differential rotation sensitive torque $T_2$. The first and second differential rotation sensitive torque maps 623, 624 show a control characteristic that the differential rotation sensitive torque $T_2$ increases as the rotation speed difference ΔV between the front and rear wheels increases and the differential rotation sensitive torque $T_2$ becomes a constant value when the rotation speed difference ΔV between the front and rear wheels is a predetermined value or larger. The CPU 61 functions as the differential rotation sensitive torque calculation unit 612 to calculate the differential rotation sensitive torque $T_2$ by referring to a differential rotation sensitive torque map selected by the driver from the first and second differential rotation sensitive torque maps 623, 624.

In the first differential rotation sensitive torque map 623, the differential rotation sensitive torque $T_2$ rises more slowly than that in the second differential rotation sensitive torque map 624. Accordingly, for example, even when the left front wheel 11 or the right front wheel 12 slips during the vehicle travels in a two-wheel drive state and a drive force is distributed to the left and right rear wheels 13, 14, occurrence of vibration in the drive force transmission system 2 which is the propeller shaft 20 or the like is prevented. On the other hand, the rise of the differential rotation sensitive torque $T_2$ becomes gentle, and traction performance decreases.

Figure 5A:
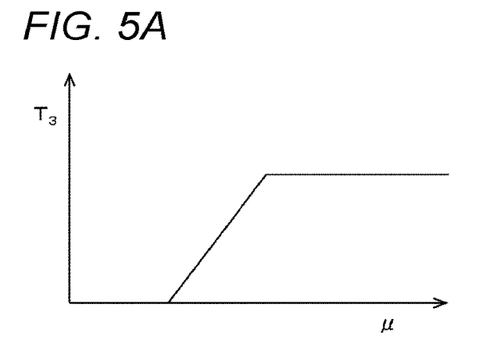
FIG. 5A shows a first start time torque map.
Figure 5B:
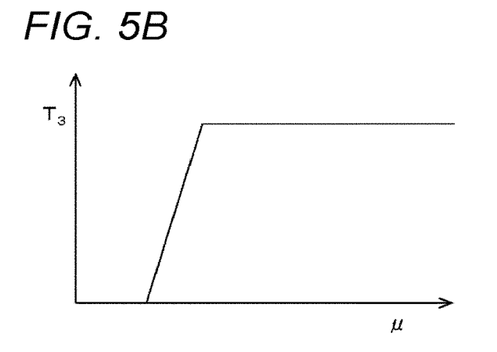
FIG. 5B shows a second start time torque map.

FIG. 5A shows the first start time torque map 625, and FIG. 5B shows the second start time torque map 626. In FIGS. 5A and 5B, an X axis indicates a road surface friction coefficient μ, and a Y axis indicates a start time torque $T_3$. The first and second start time torque maps 625, 626 show a control characteristic that the start time torque $T_3$ increases as the road surface friction coefficient μ increases and the start time torque $T_3$ becomes a constant value when the road surface friction coefficient μ is a predetermined value or larger. The CPU 61 functions as the start time torque calculation unit 613 to calculate the start time torque $T_3$ by referring to a start time torque map selected by the driver from the first and second start time torque maps 625, 626.

In the first start time torque map 625, the start time torque $T_3$ is set to be smaller than that in the second start time torque map 626. Accordingly, it is possible to prevent occurrence of a vibration phenomenon in which the left and right front wheels 11, 12 and the left and right rear wheels 13, 14 alternately slip. On the other hand, the traction performance when the vehicle starts decreases.

This vibration phenomenon occurs when the vehicle starts in the four-wheel drive state due to, for example, a repeated state in which, when the left and right front wheels 11, 12 slip, most of a drive force is transmitted to the left and right rear wheels 13, 14 and a twist of the propeller shaft 20 increases, and the right and left rear wheels 13, 14 slip due to an elastic force of the twist of the propeller shaft 20 and the propeller shaft 20 is twisted to an opposite side so that the left and right front wheels 11, 12 slip again.

The driver can select any one of the first drive force sensitive torque map 621 and the second drive force sensitive torque map 622, any one of the first differential rotation sensitive torque map 623 and the second differential rotation sensitive torque map 624, and any one of the first start time torque map 625 and the second start time torque map 626, respectively, so as to change the control characteristic of the drive force transmission device 5.

FIGS. 3 to 5 show two torque maps, respectively, and a case in which the driver can select any one of these two torque maps has been described. However, a third torque map may be added to the first and second torque maps so that the driver can select any one of three torque maps. In this case, the third torque map may have, for example, a control characteristic intermediate between the first and second torque maps, and may have a greater focus on the fuel efficiency and the traction performance than the second torque map.

Figure 6:
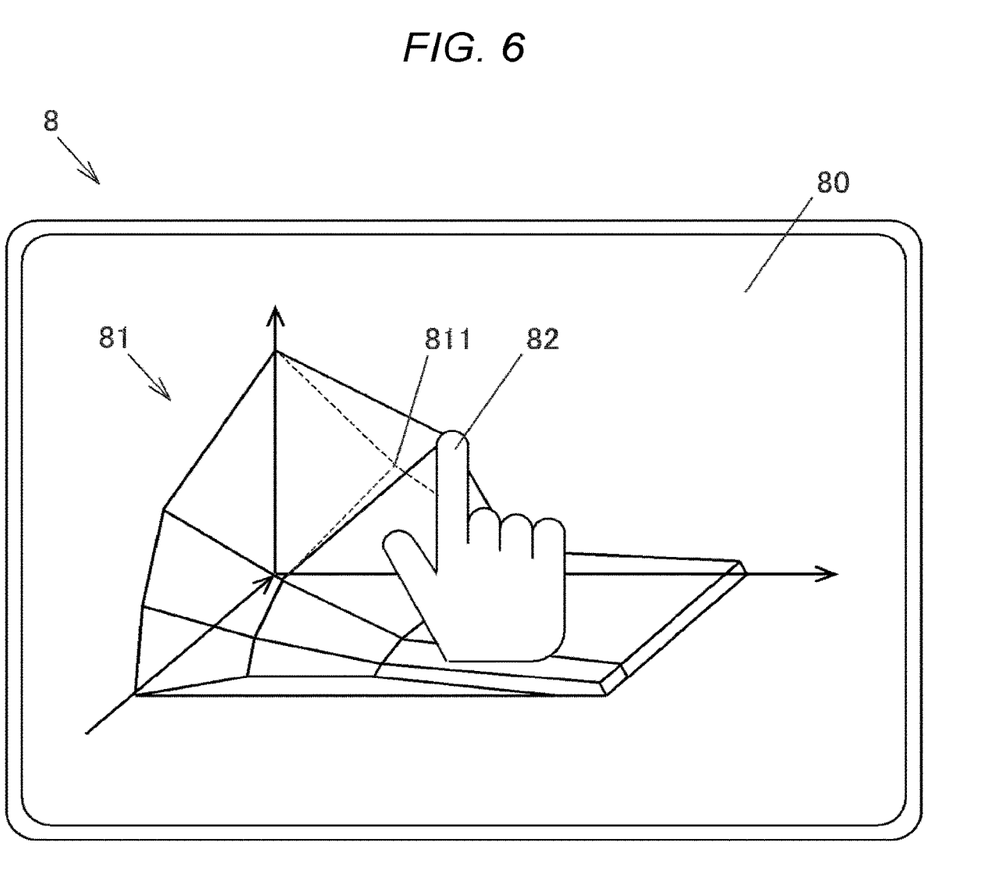
FIG. 6 is an illustrative view illustrating an example of a GUI screen when a driver performs torque map modification operation.

The driver may be able to modify (tune) each torque map as desired. In this case, it is possible to accept torque map modification operation performed by the driver by preparing a torque map having a standard control characteristic and enabling the driver to change a position (a coordinate value) of an inflection point of the torque map graphically displayed on the touch panel of the input device 8 by touch operation, for example.

FIG. 6 is an illustrative view illustrating an example of the GUI screen when the driver performs the torque map modification operation. FIG. 6 shows a drive force sensitive torque map 81 displayed on a touch panel 80 of the input device 8. The driver can shift a position of an inflection point 811 which is a bending point of a straight line of the drive force sensitive torque map 81 to change a coordinate value of the inflection point 811 by performing drag operation by touching a display part of the inflection point 811 with a finger 82 thereof. In FIG. 6, a straight line portion of the drive force sensitive torque map 81 before the change is indicated by a broken line, and a straight line portion being changed is indicated by a solid line. The differential rotation sensitive torque map and the start time torque map can also be modified similarly.

By providing the control device 6 with this function, a degree of freedom in changing the control characteristic is increased as compared with a case in which a torque map selected by the driver from among a plurality of preset torque maps is used for controlling the drive force transmission device 5. This function is particularly useful for an athlete who participates in an automobile competition such as a rally. When modification operation that is determined to be inappropriate for traveling safety is performed, the modification operation may be invalidated.

(Operation and Effects of First Embodiment)

According to the above-described first embodiment, the control characteristic of the drive force transmission device 5 can be changed by individual drivers, so that it is possible to cope with preferences of various drivers, and to improve a degree of satisfaction of a larger number of drivers. Even a driver who does not have specialized knowledge of vehicle operation can easily select a control characteristic as desired by using the torque map selected by the driver from among the plurality of torque maps showing the control characteristic of the drive force transmission device 5 for controlling the drive force transmission device 5.

Second Embodiment

Figure 7:
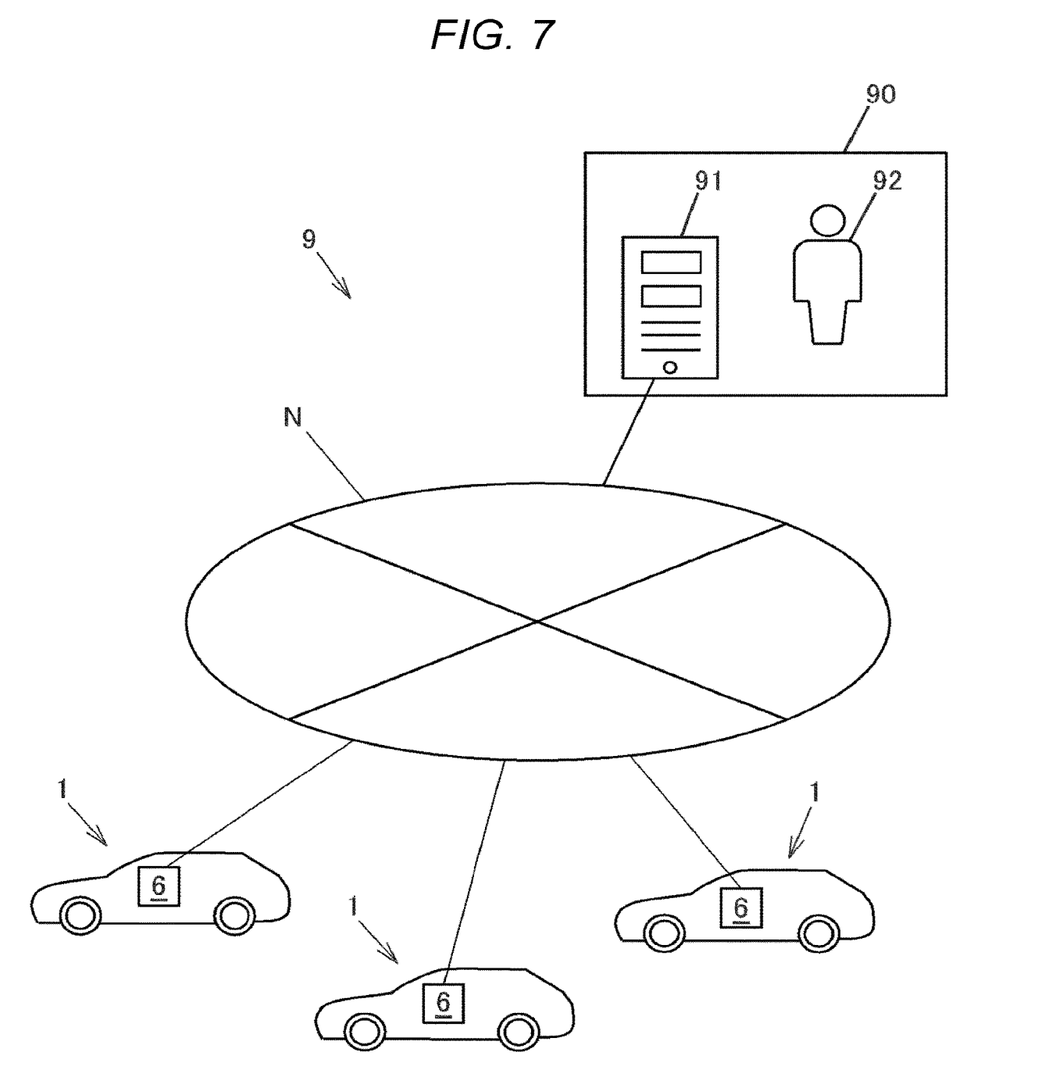
FIG. 7 is a schematic view illustrating a configuration example of a network server system according to a second embodiment.

Next, the second embodiment of the present invention will be described with reference to FIG. 7. FIG. 7 is a schematic view illustrating a configuration example of a network server system according to the second embodiment.

A network server system 9 according to the present embodiment is configured to provide the control device 6 of the four-wheel drive vehicle 1 with a function of connecting to a telecommunication line network N which is the Internet or the like, and to enable access to a server 91 managed by a manufacturer 90 of the four-wheel drive vehicle 1 or the control device 6. The control device 6 of each four-wheel drive vehicle 1 transmits a selection status of the torque map by the driver to the server 91 configured to aggregate the selection status.

The server 91 is configured to acquire and aggregate the selection status of the first and second drive force sensitive torque maps 621, 622, the selection status of the first and second differential rotation sensitive torque maps 623, 624, and the selection status of the first and second start time torque maps 625, 626 from the control devices 6 of a plurality of the four-wheel drive vehicles 1. A developer 92 of the manufacturer 90 can grasp a tendency of preferences of drivers based on an aggregate result. More specifically, it is possible to know whether the number of drivers who demand high vibration prevention performance is larger than the number of drivers who demand high fuel efficiency and high traction performance. This information can be used for subsequent development and improvement of the control device 6.

The control device 6 can communicate with the server 91 via the telecommunication line network N, so that the control device 6 can download and acquire information on an improved torque map from the server 91, and can update the torque map stored in the storage unit 62.

The network server system 9 may be constructed such that a torque map modified by the driver of the four-wheel drive vehicle 1 is uploaded to the server 91 and another driver can download the uploaded torque map and use the torque map for controlling the drive force transmission device 5 of a vehicle of the other driver. In this case, the other driver may evaluate the downloaded torque map and transmit an evaluation result to the server 91.

According to the network server system 9, the developer 92 can grasp the tendency of the preferences of the drivers based on the received evaluation result, and if the evaluation result is published, a larger number of drivers can be prompted to use a torque map with high evaluation.

APPENDIX

The present invention has been described based on the embodiments. However, these embodiments do not limit the invention according to the claims. It should be noted that not all combinations of the features described in the embodiments are essential to the means for solving the problem of the invention.

The present invention can be appropriately modified and carried out without departing from the spirit of the prevent invention. For example, in the second embodiment, the control device 6 may be connected to the telecommunication line network N via a portable information terminal which is a smartphone owned by the driver or the like.

The invention claimed is:

1. A control device that is mountable on a four-wheel drive vehicle including a main drive wheel and an auxiliary drive wheel, and that is configured to control a drive force transmission device configured to transmit a drive force to the auxiliary drive wheel, the control device comprising:
   a processor and a memory storing a program, when executed by the processor, to cause the control device to:
   change a control characteristic of the drive force transmission device that indicates a relationship between a vehicle state of the four-wheel drive vehicle and a drive force transmitted to the auxiliary drive wheel in response to an input from a user interface of an input device,
   wherein the control characteristic is selected from a plurality of control characteristics in response to the input,
   wherein the plurality of control characteristics comprise a first control characteristic in which vibration prevention performance for preventing vibration and noise generated in the four-wheel drive vehicle is prioritized, and a second control characteristic in which performance contradictory with the vibration prevention performance is prioritized, and
   wherein in a case in which the first control characteristic is selected, the drive force transmitted to the auxiliary drive wheel is different than that in a case in which the second control characteristic is selected.

2. The control device for the drive force transmission device according to claim 1,
   wherein the vibration prevention performance prevents vibration and noise in a drive force transmission system configured to transmit the drive force from a drive source to the auxiliary drive wheel.

3. The control device for the drive force transmission device according to claim 2,
   wherein in the case in which the first control characteristic is selected, the drive force transmitted to the auxiliary drive wheel when the four-wheel drive vehicle starts is smaller than that in the case in which the second control characteristic is selected.

4. The control device for the drive force transmission device according to claim 2,
   wherein in the case in which the first control characteristic is selected, the drive force transmitted to the auxiliary drive wheel when the four-wheel drive vehicle travels in a steady traveling state is larger than that in the case in which the second control characteristic is selected.

5. The control device for the drive force transmission device according to claim 1,
   wherein a selection status of the control characteristic is transmitted to a server configured to aggregate the selection status.

6. The control device for the drive force transmission device according to claim 1,
   wherein the input device includes a touch screen configured to receive a touch operation.

7. A control device that is mountable on a four-wheel drive vehicle including a main drive wheel and an auxiliary drive wheel, and that is configured to control a drive force transmission device configured to transmit a drive force to the auxiliary drive wheel, the control device comprising:
   a processor and a memory storing a program, when executed by the processor, to cause the control device to:
   change a control characteristic of the drive force transmission device that indicates a relationship between a vehicle state of the four-wheel drive vehicle and a drive force transmitted to the auxiliary drive wheel in response to an input from an input device,
   wherein the control characteristic is selected from a plurality of control characteristics in response to the input,
   wherein the plurality of control characteristics comprise a first control characteristic in which vibration prevention performance for preventing vibration and noise generated in the four-wheel drive vehicle is prioritized, and a second control characteristic in which performance contradictory with the vibration prevention performance is prioritized, and
   wherein a selection status of the control characteristic is transmitted to a server configured to aggregate the selection status.

* * * * *